(12) United States Patent
Kuromizu

(10) Patent No.: US 8,432,504 B2
(45) Date of Patent: Apr. 30, 2013

(54) BACKLIGHT UNIT, DISPLAY UNIT AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 742 days.

(21) Appl. No.: 12/602,665

(22) PCT Filed: Jan. 18, 2008

(86) PCT No.: PCT/JP2008/050568
§ 371 (c)(1), (2), (4) Date: Dec. 2, 2009

(87) PCT Pub. No.: WO2008/149567
PCT Pub. Date: Dec. 11, 2008

(65) Prior Publication Data
US 2010/0177030 A1    Jul. 15, 2010

(30) Foreign Application Priority Data
Jun. 4, 2007   (JP) .................................. 2007-147685

(51) Int. Cl.
G02F 1/136   (2006.01)
(52) U.S. Cl.
USPC ............................................. 349/46; 349/58
(58) Field of Classification Search ............ 349/58, 349/46
See application file for complete search history.

(56) References Cited

U.S. PATENT DOCUMENTS

| 7,128,461 B2 * | 10/2006 | Hwang | 362/632 |
| 2002/0044437 A1 * | 4/2002 | Lee | 362/31 |
| 2009/0268121 A1 | 10/2009 | Hisada | |
| 2010/0045888 A1 | 2/2010 | Naritomi | |

FOREIGN PATENT DOCUMENTS

| CN | 2500055 Y | 7/2002 |
| EP | 2 151 709 A1 | 2/2010 |
| JP | 05-045736 A | 2/1993 |
| JP | 2004-219926 A | 8/2004 |
| JP | 2005-135670 A | 5/2005 |
| JP | 2005-285714 A | 10/2005 |
| JP | 2006-216512 A | 8/2006 |
| JP | 2007-12569 A | 1/2007 |
| JP | 2007-080627 A | 3/2007 |
| WO | 2004/068207 A1 | 8/2004 |
| WO | 2007/034786 A1 | 3/2007 |
| WO | 2007/049379 A1 | 5/2007 |
| WO | 2008/146498 A1 | 12/2008 |

OTHER PUBLICATIONS

Official Communication issued in International Patent Application No. PCT/JP2008/050568, mailed on Feb. 19, 2008.

* cited by examiner

Primary Examiner — Phu Vu
(74) Attorney, Agent, or Firm — Keating & Bennett, LLP

(57) ABSTRACT

A backlight unit in which warping in a diffusion plate can be sufficiently prevented includes a light source, a diffusion plate arranged to diffuse light emitted from the light source and including a catching portion in a peripheral portion thereof, a support pedestal arranged to support the diffusion plate, an optical sheet arranged on the diffusion plate, and a diffusion-plate presser member arranged to engage with the catching portion of the diffusion plate and to sandwich the diffusion plate between the support pedestal.

11 Claims, 9 Drawing Sheets

BACKLIGHT UNIT, DISPLAY UNIT AND TELEVISION RECEIVER

BACKGROUND OF THE INVENTION

1. Field of the Invention

The present invention relates to a backlight unit, a display unit, and a television receiver, and in particular, the present invention relates to a backlight unit, a display unit, and a television receiver, all of which are provided with a diffusion plate that diffuses light emitted from a light source.

2. Description of the Related Art

Conventionally, there are known backlight units provided with a diffusion plate that diffuses light emitted from a light source (e.g., see JP-A-2005-135670). In JP-A-2005-135670, a backlight unit is provided with fluorescent tubes (light sources), a diffusion plate diffusing light emitted from the fluorescent tubes and having holes (catching portions) in a peripheral portion thereof, and with pulling means engaging with the holes in the diffusion plate and applying tension to the diffusion plate in the planar direction.

In such backlight units provided with fluorescent tubes (light sources) and a diffusion plate, generally, due to a rise in temperature when the fluorescent tubes are lit, a diffusion plate 100 warps like a barrel (see FIGS. 20A and 20B) or a saddle (see FIGS. 21A and 21B), and in addition the peripheral portion moves inward in the planar direction.

In the backlight unit disclosed in JP-A-2005-135670, by providing the pulling means that applies tension to the diffusion plate, it is possible to prevent the peripheral portion of the diffusion plate from moving inward in the planar direction, and thus to prevent, to a certain degree, warping in the diffusion plate caused by a rise in temperature when the fluorescent tubes are lit.

In the backlight unit disclosed in above-mentioned JP-A-2005-135670, however, moving of the peripheral portion of the diffusion plate inward in the planar direction can be prevented indeed, but no mechanism is provided that fixes (supports) the diffusion plate in the direction perpendicular to the planar direction of the diffusion plate. Thus, inconveniently, it is difficult to prevent the diffusion plate from deforming in the direction perpendicular to the planar direction of the diffusion plate. For this reason, there arises a problem whereby warping in the diffusion plate is difficult to prevent sufficiently. When warping occurs in the diffusion plate, inconveniently, there may be cases where the diffusion plate makes contact with a display panel, which is arranged so as to face the diffusion plate, and thus the surface pressure of the display panel varies, making it difficult to obtain satisfactory images, and where warping occurs also in an optical sheet, which is arranged on the diffusion plate, and thus achieving uniform brightness is made difficult.

SUMMARY OF THE INVENTION

In order to solve the above problems, preferred embodiments of the present invention provide a backlight unit, a display unit, and a television receiver, all in which warping in a diffusion plate is reliably and sufficiently prevented.

According to a first preferred embodiment of the present invention, a backlight unit includes a light source, a diffusion plate arranged to diffuse light emitted from the light source and having a catching portion in a peripheral portion thereof, a support pedestal arranged to support the diffusion plate, an optical sheet arranged on the diffusion plate, and a diffusion-plate presser member arranged to engage with the catching portion of the diffusion plate and sandwiching the diffusion plate between the support pedestal.

In the backlight unit according to the first preferred embodiment, as described above, there are provided the diffusion plate having the catching portion in the peripheral portion, and the diffusion-plate presser member engaging with the catching portion of the diffusion plate. This makes it possible, by the diffusion-plate presser member, to prevent the peripheral portion of the diffusion plate from moving inward in the planar direction. Thus, it is possible to prevent warping in the diffusion plate caused by a rise in temperature when the light source is lit. Furthermore, there are provided the support pedestal that supports the diffusion plate, and the diffusion-plate presser member that sandwiches the diffusion plate between the support pedestal. This makes it possible to fix (support) the diffusion plate in a direction perpendicular or substantially perpendicular to the planar direction of the diffusion plate. Thus, it is possible to prevent the diffusion plate from deforming in the direction perpendicular or substantially perpendicular to the planar direction of the diffusion plate. In this way, warping in the diffusion plate is reliably and sufficiently prevented. As a result, when a display panel is arranged so as to face the diffusion plate, it is possible to prevent the surface pressure of the display panel varying due to the diffusion plate making contact with the display panel, and thus satisfactory images can be obtained. Moreover, it is possible to prevent warping in the optical sheet that is arranged on the diffusion plate, and thus to achieve uniform brightness.

Moreover, in the backlight unit according to the first preferred embodiment, as described above, there is provided the diffusion-plate presser member that engages with the catching portion of the diffusion plate and sandwiches the diffusion plate between the support pedestal. This makes it possible, by the diffusion-plate presser member, to prevent the peripheral portion of the diffusion plate moving inward in the planar direction, and in addition to prevent the diffusion plate from deforming in the direction perpendicular or substantially perpendicular to the planar direction of the diffusion plate. Thus, it is possible to prevent increased number of components, compared with a case in which separate members are provided for preventing the peripheral portion of the diffusion plate from moving inward in the planar direction, and for preventing the diffusion plate from deforming in the direction perpendicular to the planar direction of the diffusion plate.

In the backlight unit according to the above-described first preferred embodiment, preferably, the catching portion of the diffusion plate is arranged to extend along the peripheral portion of the diffusion plate. With this structure, by the diffusion-plate presser member, moving of the peripheral portion of the diffusion plate inward in the planar direction can be prevented evenly, and in addition deforming of the diffusion plate in the direction perpendicular or substantially perpendicular to the planar direction of the diffusion plate can be prevented evenly. Thus, warping in the diffusion plate is reliably prevented effectively.

In the backlight unit according to the above-described first preferred embodiment, preferably, the diffusion-plate presser member is engaged with the catching portion of the diffusion plate with tension applied in the planar direction of the diffusion plate. With this structure, it is possible to further prevent the peripheral portion of the diffusion plate moving inward in the planar direction. Thus, warping in the diffusion plate caused by a rise in temperature when the light source is lit can be further prevented.

In this case, preferably, a portion of the diffusion-plate presser member that engages with the catching portion of the diffusion plate preferably is elastically deformable. With this structure, it is possible to easily engage the diffusion-plate presser member with the catching portion of the diffusion plate with tension applied in the planar direction of the diffusion plate.

In the backlight unit according to the above-described first preferred embodiment, preferably, the diffusion-plate presser member sandwiches the diffusion plate between the support pedestal by pressing the diffusion plate, and the diffusion-plate presser member has a biasing member arranged to bias the diffusion plate in the direction in which the diffusion plate is pressed. With this structure, it is possible to easily fix (support) the diffusion plate in the direction perpendicular or substantially perpendicular to the planar direction of the diffusion plate. Thus, it is possible to easily prevent the diffusion plate from deforming in the direction perpendicular or substantially perpendicular to the planar direction of the diffusion plate.

In the backlight unit according to the above-described first preferred embodiment, preferably, a portion of the diffusion-plate presser member that makes contact with the diffusion plate is preferably formed of resin. With this structure, when the diffusion plate moves (slides) with respect to the diffusion-plate presser member due to a rise in temperature when the light source is lit, it is possible to prevent the diffusion plate from being scratched, and to prevent squeaking noise. Moreover, the portion of the diffusion-plate presser member that makes contact with the diffusion plate is preferably formed of resin. As a result, it is possible to easily form the portion of the diffusion-plate presser member that engages with the catching portion of the diffusion plate to be elastically deformable.

In the backlight unit according to the above-described first preferred embodiment, preferably, the diffusion-plate presser member is formed of metal or a metal compound. With this structure, a high rigidity can be achieved in the diffusion-plate presser member, and thus it is possible to prevent the diffusion-plate presser member from deforming.

In the backlight unit according to the above-described first preferred embodiment, preferably, the color of the surface of the diffusion-plate presser member is white/whitish or black/blackish. With this structure, when the color of the surface of the diffusion-plate presser member is white/whitish, by the light reflected at the surface of the diffusion-plate presser member, the brightness of the display panel can be enhanced. When the color of the surface of the diffusion-plate presser member is black/blackish, it is possible to make the color of the outermost peripheral portion of the display panel black/blackish, and thus to have the diffusion-plate presser member serve as a frame of the display panel.

According to a second preferred embodiment of the present invention, a display unit includes the backlight unit described above, and a display panel illuminated by the backlight unit. With this structure, it is possible to obtain a display unit in which warping in a diffusion plate is reliably and sufficiently prevented.

In the display unit according to the above-described second preferred embodiment, preferably, the display panel is a liquid crystal display panel in which liquid crystal is sealed in between a pair of substrates. With this structure, it is possible to obtain a liquid crystal display unit in which warping in the diffusion plate is reliably and sufficiently prevented.

According to a third preferred embodiment of the present invention, a television receiver includes the display unit described above, a cabinet housing the display unit, a tuner, and a speaker. With this structure, it is possible to obtain a television receiver in which warping in a diffusion plate is reliably and sufficiently prevented.

As described above, according to a preferred embodiment of the present invention, it is possible to easily obtain a backlight unit, a display unit, and a television receiver, all in which warping in a diffusion plate is reliably and sufficiently prevented.

Other features, elements, steps, characteristics and advantages of the present invention will become more apparent from the following detailed description of preferred embodiments of the present invention with reference to the attached drawings.

BRIEF DESCRIPTION OF THE PREFERRED EMBODIMENTS

DETAILED DESCRIPTION OF THE PREFERRED EMBODIMENTS

First Preferred Embodiment

Figure 1:
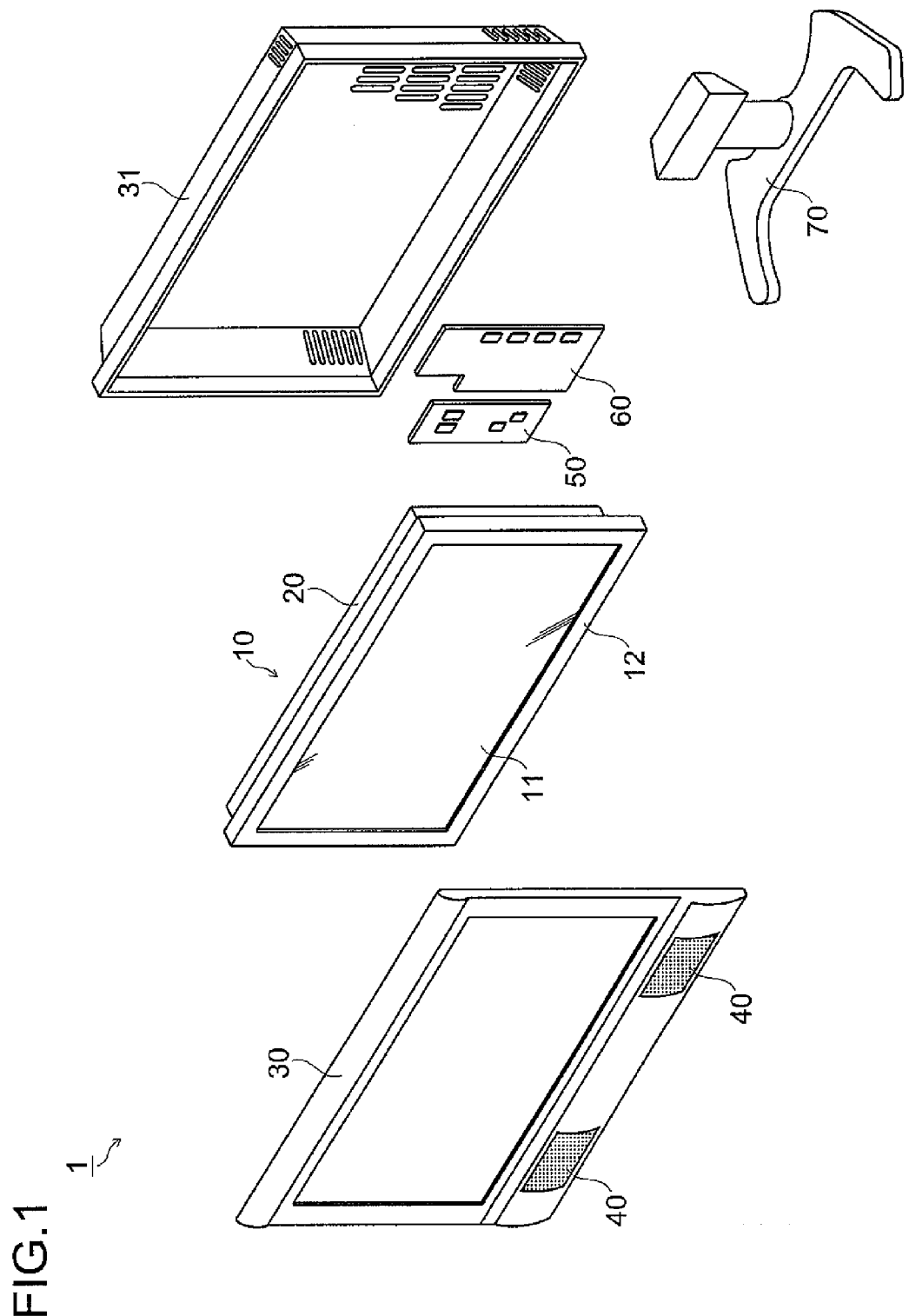
FIG. 1 is an exploded perspective view showing the overall structure of a liquid crystal television receiver provided with a backlight unit according to a first preferred embodiment of the present invention.
Figure 2:
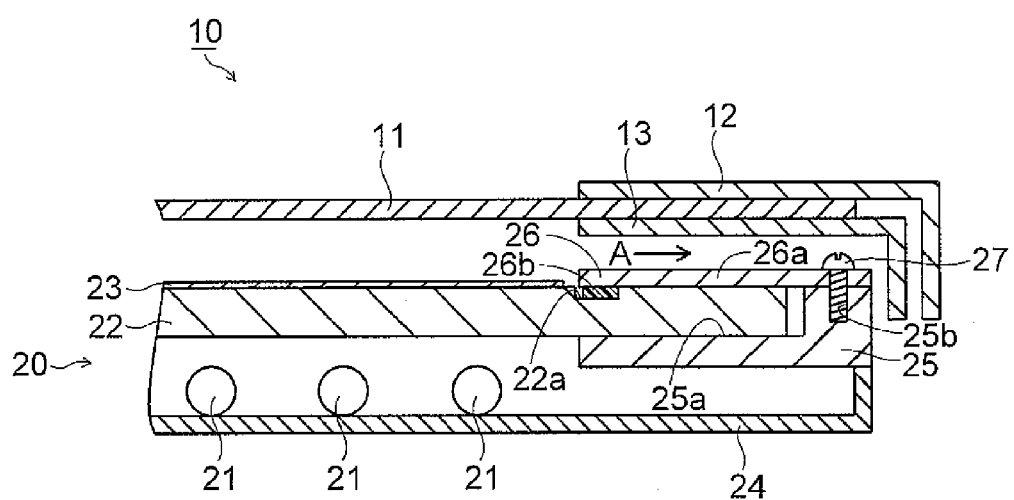
FIG. 2 is a sectional view showing the structure of a liquid crystal display unit having the backlight unit according to the first preferred embodiment of the present invention.
Figure 3:
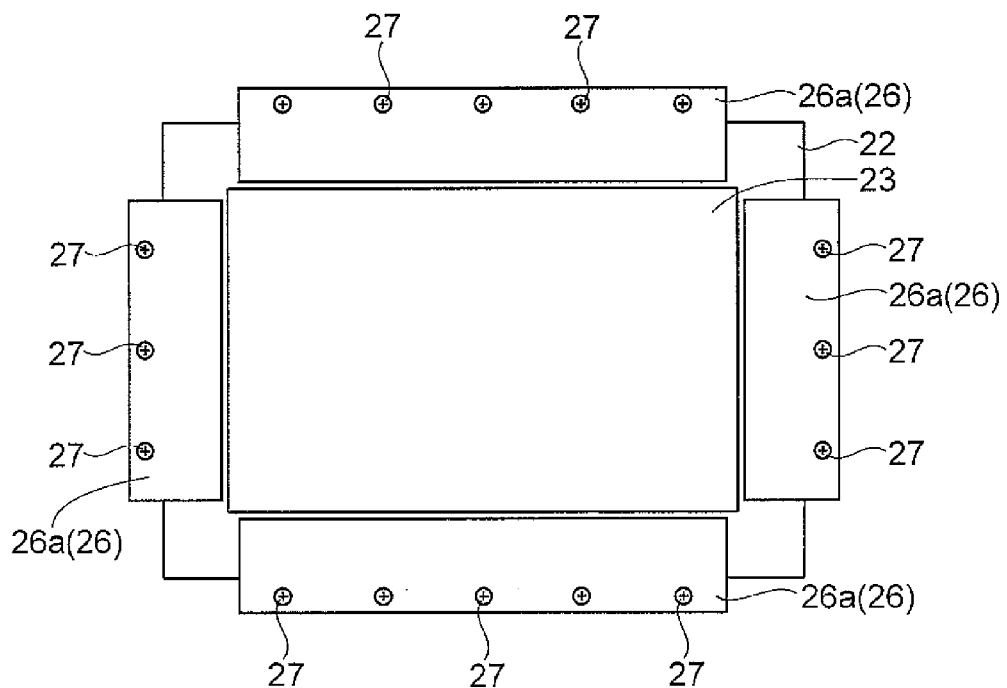
FIG. 3 is a plan view showing the structure of the backlight unit shown in FIG. 2 around a diffusion plate.
Figure 4:
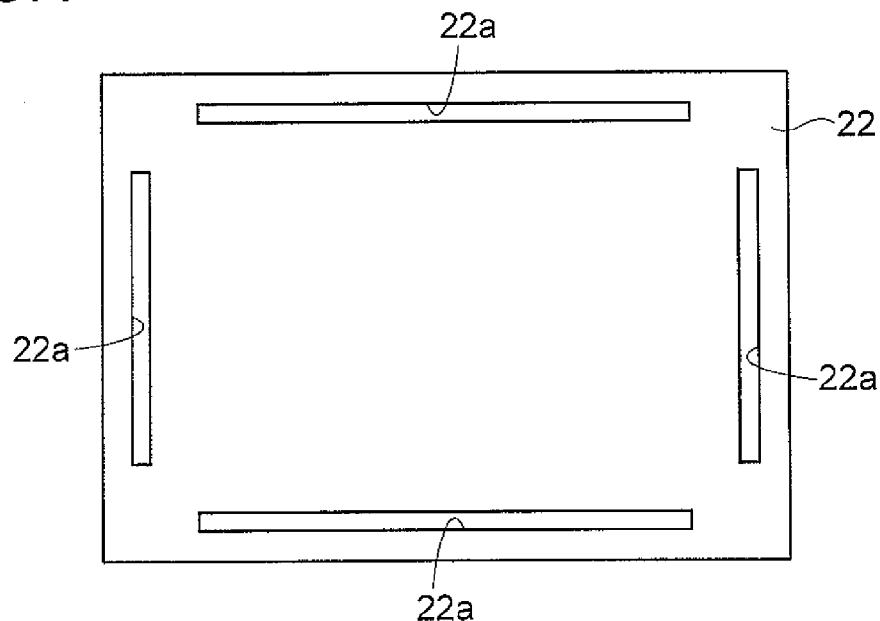
FIG. 4 is a plan view showing the structure of the diffusion plate of the backlight unit shown in FIG. 2.
Figure 5:
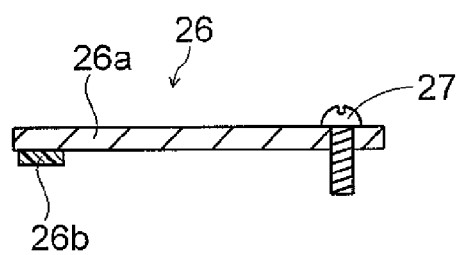
FIG. 5 is a sectional view showing the structure of a diffusion-plate presser member of the backlight unit shown in FIG. 2.

FIG. 1 is an exploded perspective view showing the overall structure of a liquid crystal television receiver provided with a backlight unit according to a first preferred embodiment of the present invention. FIG. 2 is a sectional view showing the structure of a liquid crystal display unit having the backlight unit according to the first preferred embodiment of the present invention. FIG. 3 is a plan view showing the structure of the backlight unit shown in FIG. 2 around a diffusion plate. FIG. 4 is a plan view showing the structure of the diffusion plate of the backlight unit shown in FIG. 2. FIG. 5 is a sectional view showing the structure of a diffusion-plate presser member of the backlight unit shown in FIG. 2. With reference to FIGS. 1 to 5, a description will be given of the structure of the liquid crystal television receiver 1 provided with the backlight unit 20 according to the first preferred embodiment of the present invention. Note that the liquid crystal television receiver 1 is one example of a "television receiver" according to a preferred embodiment of the present invention.

As shown in FIG. 1, the liquid crystal television receiver 1 that is provided with the backlight unit 20 according to the first preferred embodiment of the invention preferably includes a liquid crystal display unit 10 including the backlight unit 20, a front cabinet 30 and a rear cabinet 31 that house the liquid crystal display unit 10, speakers 40 fitted to the front cabinet 30, a tuner 50, a power supply 60, and a supporter 70. For the front cabinet 30, the rear cabinet 31, the speakers 40, the tuner 50, the power supply 60, and the supporter 70, those that have been conventionally used commonly can be applied; thus, they will be described briefly. Note that the liquid crystal display unit 10 is one example of a "display unit" according to a preferred embodiment of the present invention, and the front cabinet 30 and the rear cabinet 31 are examples of a "cabinet" according to a preferred embodiment of the present invention.

The front cabinet 30 and the rear cabinet 31 house the liquid crystal display unit 10, the tuner 50, and the power supply 60, and are supported by the supporter 70. The tuner 50 generates an image signal and an audio signal of a predetermined channel from a radio wave received. The speaker 40 outputs sound based on the audio signal generated by the tuner 50. The power supply 60 is so designed as to feed electric power to the liquid crystal display unit 10, the speakers 40, and the tuner 50. Note that the speakers 40, the tuner 50, and the power supply 60 may be built into the liquid crystal display unit 10.

As shown in FIG. 2, the liquid crystal display unit 10 preferably includes the backlight unit 20, a liquid crystal display panel 11 arranged at the front of the backlight unit 20, and a front chassis 12 and a frame 13 that sandwich the liquid crystal display panel 11 to support it. Note that the liquid crystal display panel 11 is one example of a "display panel" according to a preferred embodiment of the present invention.

The liquid crystal display panel 11 has pixels arrayed in a matrix. In addition, the liquid crystal display panel 11 displays images by being illuminated by the backlight unit 20 and having the light from the backlight unit 20 passing through it. Moreover, the liquid crystal display panel 11 is formed with liquid crystal being sealed in between a pair of substrates.

The backlight unit 20 preferably includes a plurality of light sources 21, a diffusion plate 22 arranged to diffuse light emitted from the light sources 21, an optical sheet 23 arranged on the front surface of the diffusion plate 22, a back chassis 24 arranged to cover the light sources 21 and the diffusion plate 22 from behind, a support pedestal 25 that supports the diffusion plate 22, and a diffusion-plate presser member 26 that sandwiches the diffusion plate 22 between the support pedestal 25.

The light sources 21 preferably include a plurality of cylindrical fluorescent tubes arranged at a predetermined interval (period), and fixed at the front of the back chassis 24. Note that the light sources 21 may include a meandering fluorescent tube, for example.

The diffusion plate 22 is preferably a plate-shaped transmissive member holding a diffusion member. In addition, the diffusion plate 22 is arranged so as to face the liquid crystal display panel 11.

Here, in the first preferred embodiment, as shown in FIGS. 2 and 4, the diffusion plate 22 preferably has a rectangular or substantially rectangular shape as seen in a plan view, and catching portions 22a, each preferably having a concave shape, are formed at the four sides, forming a peripheral portion, of the rectangular or substantially rectangular shape, one at each of the four sides. The catching portions 22a are formed on the front surface (upper surface) of the diffusion plate 22. As shown in FIG. 4, the catching portions 22a are arranged such that two opposing catching portions 22a are arranged in parallel or substantially in parallel. In addition, the catching portions 22a preferably have a narrow rectangular shape so as to extend along the peripheral portion of the diffusion plate 22. Note that the catching portions 22a may be formed to have a shape other than rectangular or substantially rectangular. For example, they may be formed such that those at two opposing sides have an arc shape or the like, or may be formed to have a narrow elliptic shape. Moreover, the catching portions 22a may be formed to have other shapes.

Moreover, in the first preferred embodiment, each of the catching portions 22a is preferably arranged such that both ends of the catching portion 22a do not reach the ends (of the four sides) of the diffusion plate 22.

Moreover, in the first preferred embodiment, as shown in FIG. 2, the catching portion 22a is preferably arranged such that it has a depth smaller than the thickness of the diffusion plate 22. That is, the catching portion 22a is preferably arranged such that it does not penetrate through the diffusion plate 22.

The optical sheet 23 is preferably a prism sheet or a lens sheet, and has a function for focusing light from the diffusion plate 22 in a predetermined viewing angle. As shown in FIG. 3, the optical sheet 23 has an area smaller than the diffusion plate 22, and is arranged inward than the diffusion-plate presser member 26. In addition, the optical sheet 23 is held on the front surface (upper surface) of the diffusion plate 22 by an unillustrated optical-sheet presser member. Note that a gap may be provided between the optical sheet 23 and the unillustrated optical-sheet presser member so that no pressing force acts on the optical sheet 23.

As shown in FIG. 2, at the peripheral portion of the back chassis 24, the support pedestal 25 is fixed. Note that the support pedestal 25 may be formed integral with the back chassis 24.

In the support pedestal 25, there are provided a support surface 25a supporting the peripheral portion of the diffusion plate 22, and a threaded hole 25b to which a screw 27 is fitted.

Moreover, in the first preferred embodiment, as shown in FIG. 5, the diffusion-plate presser member 26 is preferably defined by a metal plate member 26a to which a plurality of screws 27 are fitted, and a catching member 26b preferably formed of resin, rubber, or other suitable material that can be elastically deformed. Note that the plate member 26a may be integral with the catching member 26b using resin, rubber, or other suitable material, in which case highly solid resin, rubber, or other suitable material is preferably used. The diffusion-plate presser member 26 may preferably be formed of metal or a metal compound. In this case, it is possible to enhance the rigidity of the diffusion-plate presser member 26, and thus possible to prevent deformation of the diffusion-plate presser member 26.

Moreover, in the first preferred embodiment, the plate member 26a of the diffusion-plate presser member 26 preferably has a surface of which the color is white/whitish or black/blackish.

Moreover, in the first preferred embodiment, as shown in FIGS. 2 and 3, the diffusion-plate presser member 26 sandwiches the diffusion plate 22 between the support surface 25a (see FIG. 2) of the support pedestal 25, by the plate member 26a being fixed with the plurality of screws 27 screwed to the threaded holes 25b (see FIG. 2) of the support pedestal 25. In addition, it is preferable that the diffusion-plate presser member 26 be arranged such that the catching member 26b presses the catching portion 22a of the diffusion plate 22 toward the support pedestal 25. Moreover, the diffusion-plate presser member 26 may be arranged such that the back surface (lower surface) of the plate member 26a presses the diffusion plate 22 toward the support pedestal 25.

Moreover, in the first preferred embodiment, as shown in FIG. 2, the catching member 26b of the diffusion-plate presser member 26 is engaged with the catching portion 22a of the diffusion plate 22 with tension applied in the planar direction (the direction indicated by an arrow A) of the diffusion plate 22. Specifically, the diffusion-plate presser member 26 is fixed with the outside surface of the catching member 26b of the diffusion-plate presser member 26 making contact with the inside surface of the catching portion 22a of the diffusion plate 22, and the diffusion plate 22 is fixed with the peripheral portion being pulled outward.

In the first preferred embodiment, as described above, there are provided the diffusion plate 22 that has the catching portion 22a at the peripheral portion, and the diffusion-plate presser member 26 that engages with the catching portion 22a of the diffusion plate 22. This makes it possible to prevent the peripheral portion of the diffusion plate 22 from moving inward in the planar direction by the diffusion-plate presser member 26. Thus, it is possible to prevent warping in the diffusion plate 22 caused by a rise in temperature when the light sources 21 are lit. Furthermore, there are provided the support pedestal 25 that supports the diffusion plate 22, and the diffusion-plate presser member 26 that sandwiches the diffusion plate 22 between the support pedestal 25. This makes it possible to fix (support) the diffusion plate 22 in a direction perpendicular or substantially perpendicular to the planar direction of the diffusion plate 22. Thus, it is possible to prevent the diffusion plate 22 from deforming in the direction perpendicular or substantially perpendicular to the planar direction of the diffusion plate 22. Thus, warping in the diffusion plate 22 can be sufficiently prevented. As a result, it is possible to prevent variation in the surface pressure of the liquid crystal display panel 11 caused by the diffusion plate 22 (optical sheet 23) making contact with the liquid crystal display panel 11, and thus to obtain satisfactory images. Moreover, it is possible to prevent warping in the optical sheet 23 arranged on the diffusion plate 22, and thus to achieve uniform brightness.

Moreover, in the first preferred embodiment, there is provided the diffusion-plate presser member 26 that engages with the catching portion 22a of the diffusion plate 22 and sandwiches the diffusion plate 22 between the support pedestal 25. This makes it possible, by the diffusion-plate presser member 26, to prevent the peripheral portion of the diffusion plate 22 moving inward in the planar direction, to prevent the diffusion plate 22 from deforming in the direction perpendicular or substantially perpendicular to the planar direction of the diffusion plate 22, and to prevent increased number of components, compared with the case in which separate members are provided for preventing the peripheral portion of the diffusion plate 22 from moving inward in the planar direction, and for preventing the diffusion plate 22 from deforming in the direction perpendicular or substantially perpendicular to the planar direction of the diffusion plate 22.

Moreover, in the first preferred embodiment, the catching portion 22a of the diffusion plate 22 is arranged so as to extend along the peripheral portion of the diffusion plate 22. This makes it possible, by the diffusion-plate presser member 26, to evenly prevent the peripheral portion of the diffusion plate 22 from moving toward the inner side in the planar direction, and to evenly prevent the diffusion plate 22 from deforming in the direction perpendicular or substantially perpendicular to the planar direction of the diffusion plate 22. Thus, warping in the diffusion plate 22 can be prevented effectively.

Moreover, in the first preferred embodiment, the catching member 26b of the diffusion-plate presser member 26 is engaged with the catching portion 22a of the diffusion plate 22 with tension applied in the planar direction of the diffusion plate 22. This makes it possible to further prevent the peripheral portion of the diffusion plate 22 from moving inward in the planar direction, and thus to further prevent warping in the diffusion plate 22 caused by a rise in temperature when the light sources 21 are lit.

Moreover, in the first preferred embodiment, the catching member 26b of the diffusion-plate presser member 26 is preferably formed of resin, rubber, or other suitable material that can be elastically deformed. This makes it possible to easily engage the catching member 26b of the diffusion-plate presser member 26 with the catching portion 22a of the diffusion plate 22 with tension applied to the planar direction of the diffusion plate 22.

Moreover, in the first preferred embodiment, in a case where the catching member 26b of the diffusion-plate presser member 26 is formed of resin, even if the diffusion plate 22 moves (slides) with respect to the diffusion-plate presser member 26 due to a rise in temperature when the light sources 21 are lit, it is possible to prevent the diffusion plate 22 being scratched, and to prevent squeaking noise.

Moreover, in the first preferred embodiment, the color of the surface of the diffusion-plate presser member 26 is preferably white/whitish or black/blackish. In this way, when the color of the surface of the diffusion-plate presser member 26 is white/whitish, by the light reflected at the surface of the diffusion-plate presser member 26, it is possible to enhance the brightness of the liquid crystal display panel 11. When the color of the surface of the diffusion-plate presser member 26 is black/blackish, it is possible to make the color of an outermost peripheral portion of the liquid crystal display panel 11 black/blackish, and thus to have the diffusion-plate presser member 26 define a frame of the liquid crystal display panel 11.

Second Preferred Embodiment

Figure 6:
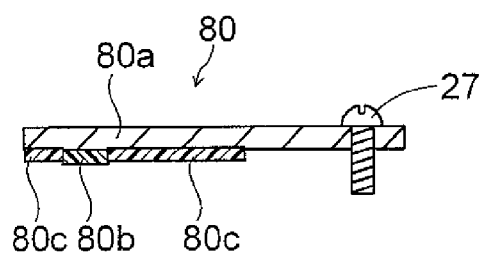
FIG. 6 is a sectional view showing the structure of a diffusion-plate presser member of a backlight unit according to a second preferred embodiment of the present invention.

FIG. 6 is a sectional view showing the structure of a diffusion-plate presser member of a backlight unit according to a second preferred embodiment of the present invention. In the second preferred embodiment, with reference to FIG. 6, a description will be given of an example, as distinct from that in the above-described first preferred embodiment, in which a resin plate 80c is provided in a diffusion-plate presser member 80. In other respects, the structure is similar to that in the above-described first preferred embodiment.

As shown in FIG. 6, the diffusion-plate presser member 80 of the backlight unit according to the second preferred embodiment of the present invention includes a plate member 80a, a catching member 80b, and the resin plate 80c. The resin plate 80c is preferably formed of resin having a relatively small friction coefficient, for example, PET (polyethylene terephthalate), acrylic resin, PC (polycarbonate), or other suitable material. The resin plate 80c is fitted to the plate member 80a so as to make contact with the diffusion plate 22. In addition, the resin plate 80c is arranged at the inner side and the outer side of the catching member 80b.

In the second preferred embodiment, as described above, the resin plate 80c with a smaller friction coefficient is arranged on the plate member 80a so as to make contact with the diffusion plate 22. In this way, when the diffusion plate 22 moves (slides) with respect to the diffusion-plate presser member 80 due to a rise in temperature when the light sources 21 are lit, it is possible to prevent the diffusion plate 22 from being scratched and, to prevent squeaking noise.

In other respects, the effects of the second preferred embodiment are similar to those of the above-described first preferred embodiment.

Third Preferred Embodiment

Figure 7:
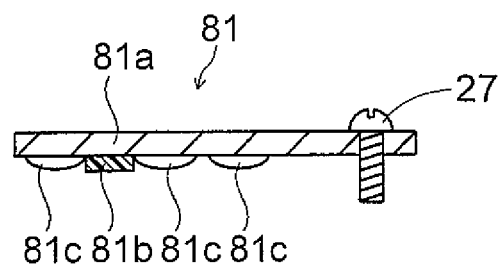
FIG. 7 is a sectional view showing the structure of a diffusion-plate presser member of a backlight unit according to a third preferred embodiment of the present invention.

FIG. 7 is a sectional view showing the structure of a diffusion-plate presser member of a backlight unit according to a third preferred embodiment of the present invention. In the third preferred embodiment, with reference to FIG. 7, a description will be given of an example, as distinct from that in the above-described second preferred embodiment, in which a projection 81c is provided on a diffusion-plate presser member 81. In other respects, the structure is similar to that in the above-described second preferred embodiment.

As shown in FIG. 7, the diffusion-plate presser member 81 of the backlight unit according to the third preferred embodiment of the present invention preferably includes a plate member 81a and a catching member 81b. The plate member 81a has projections 81c formed on its surface preferably by drawing or other suitable process. The projections 81c preferably have a curved surface extending in the direction perpendicular or substantially perpendicular to the plane of the figure, and their surfaces make linear contact with the diffusion plate 22. Note that the projections 81c may be formed such that their surfaces make point contact with the diffusion plate 22.

In the third preferred embodiment, as described above, the plate member 81a is provided with the projections 81c such that their surfaces make linear contact (or point contact) with the diffusion plate 22. This helps make the area small where the plate member 81a (projections 81c) keeps contact with the diffusion plate 22. Thus, it is possible to further prevent the squeaking noise even when the diffusion plate 22 moves (slides) with respect to the diffusion-plate presser member 81 due to a rise in temperature when the light sources 21 are lit.

Moreover, in the third preferred embodiment, by forming the projections 81c on the plate member 81a by drawing, it is possible to increase the rigidity of the plate member 81a.

In other respects, the effects of the third preferred embodiment are similar to those of the above-described second preferred embodiment.

Fourth Preferred Embodiment

Figure 8:
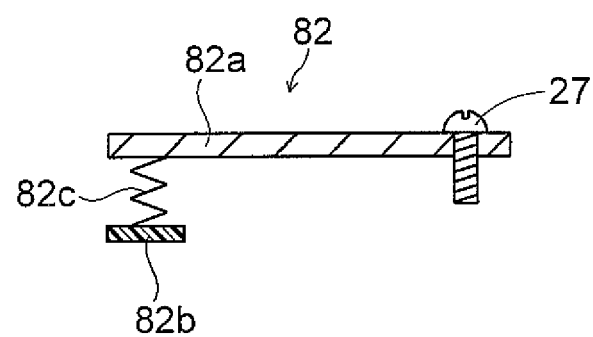
FIG. 8 is a sectional view showing the structure of a diffusion-plate presser member of a backlight unit according to a fourth preferred embodiment of the present invention.

FIG. 8 is a sectional view showing the structure of a diffusion-plate presser member of a backlight unit according to a fourth preferred embodiment of the present invention. In the fourth preferred embodiment, with reference to FIG. 8, a description will be given of an example, as distinct from that in the above-described first preferred embodiment, in which a diffusion-plate presser member 82 is provided with a compression spring 82c. In other respects, the structure is similar to that in the above-described first preferred embodiment.

As shown in FIG. 8, the diffusion-plate presser member 82 of the backlight unit according to the fourth preferred embodiment of the present invention preferably includes a plate member 82a, a catching member 82b, and a compression spring 82c arranged between the plate member 82a and the catching member 82b. Note that the compression spring 82c is one example of "biasing member" according to a preferred embodiment of the present invention. The diffusion-plate presser member 82 is fixed to the support pedestal 25 with the compression spring 82c compressed. Specifically, by the biasing force of the compression spring 82c, the catching member 82b presses (biases) the diffusion plate 22 towards the support pedestal 25. In addition, the diffusion-plate presser member 82 is fixed to the support pedestal 25 with the compression spring 82c (catching member 82b) applying tension in the planar direction of the diffusion plate 22.

In the fourth preferred embodiment, as described above, the diffusion-plate presser member 82 is provided with the compression spring 82c that presses (biases) the diffusion plate 22 towards the support pedestal 25. This makes it possible to easily fix (support) the diffusion plate 22 in the direction perpendicular or substantially perpendicular to the planar direction of the diffusion plate 22, and thus to easily prevent the diffusion plate 22 from deforming in the direction perpendicular or substantially perpendicular to the planar direction of the diffusion plate 22. Moreover, by the diffusion-plate presser member 82 being provided with the compression spring 82c that biases the diffusion plate 22, it is possible to reduce variation in the pressing force of the diffusion-plate presser member 82, and thus to further prevent warping in the diffusion plate 22. Moreover, by the diffusion-plate presser member 82 being provided with the compression spring 82c, it is possible to easily engage the diffusion-plate presser member 82 with the catching portion 22a of the diffusion plate 22 with tension applied in the planar direction of the diffusion plate 22.

In other respects, the effects of the fourth preferred embodiment are similar to those of the above-described first preferred embodiment.

Fifth Preferred Embodiment

Figure 9:
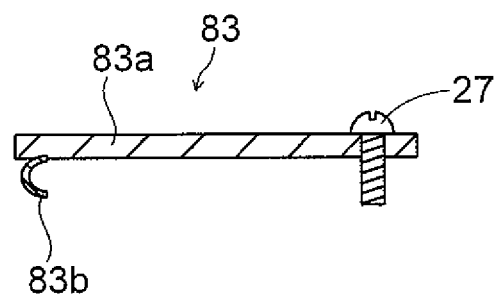
FIG. 9 is a sectional view showing the structure of a diffusion-plate presser member of a backlight unit according to a fifth preferred embodiment of the present invention.

FIG. 9 is a sectional view showing the structure of a diffusion-plate presser member of a backlight unit according to a fifth preferred embodiment of the present invention. In the fifth preferred embodiment, with reference to FIG. 9, a description will be given of an example, as distinct from that in the above-described first preferred embodiment, in which a diffusion-plate presser member 83 is provided with a catching member 83b that has a curved shape. In other respects, the structure is similar to that in the above-described first preferred embodiment.

As shown in FIG. 9, the diffusion-plate presser member 83 of the backlight unit according to the fifth preferred embodiment of the present invention preferably includes a plate member 83a, and the catching member 83b which is curved in an arc shape and formed of resin, rubber, metal, or other suitable material. Note that the catching member 83b is one example of "biasing member" according to a preferred embodiment of the present invention. The catching member 83b is formed so as to curve in an arc shape, and thus it can be elastically deformed even when it is formed of metal. The diffusion-plate presser member 83 is fixed to the support pedestal 25 with the catching member 83b applying tension in the planar direction of the diffusion plate 22. In addition, the diffusion-plate presser member 83 is fixed to the support pedestal 25 with the catching member 83b compressed in the direction perpendicular or substantially perpendicular to the planar direction of the diffusion plate 22. That is, by the biasing force (elastic force) of the catching member 83b, the catching member 83b presses (biases) the diffusion plate 22 toward the support pedestal 25.

In the fifth preferred embodiment, as described above, the catching member 83b of the diffusion-plate presser member 83 is preferably elastically deformable. This makes it possible to easily engage the diffusion-plate presser member 83 with the catching portion 22a of the diffusion plate 22 with tension applied in the planar direction of the diffusion plate 22. Moreover, the catching member 83b of the diffusion-plate presser member 83 is preferably arranged to press (bias) the diffusion plate 22 towards the support pedestal 25. This makes it possible to easily fix (support) the diffusion plate 22 in the direction perpendicular or substantially perpendicular to the planar direction of the diffusion plate 22, and thus to easily prevent the diffusion plate 22 from deforming in the direction perpendicular or substantially perpendicular to the planar direction of the diffusion plate 22. Moreover, by the diffusion-plate presser member 83 being provided with the catching member 83b that is curved in an arc shape and biases the diffusion plate 22, it is possible to reduce variation in the pressing force of the diffusion-plate presser member 83, and thus to further prevent warping in the diffusion plate 22.

In other respects, the effects of the fifth preferred embodiment are similar to those of the above-described first preferred embodiment.

Sixth Preferred Embodiment

Figure 10:
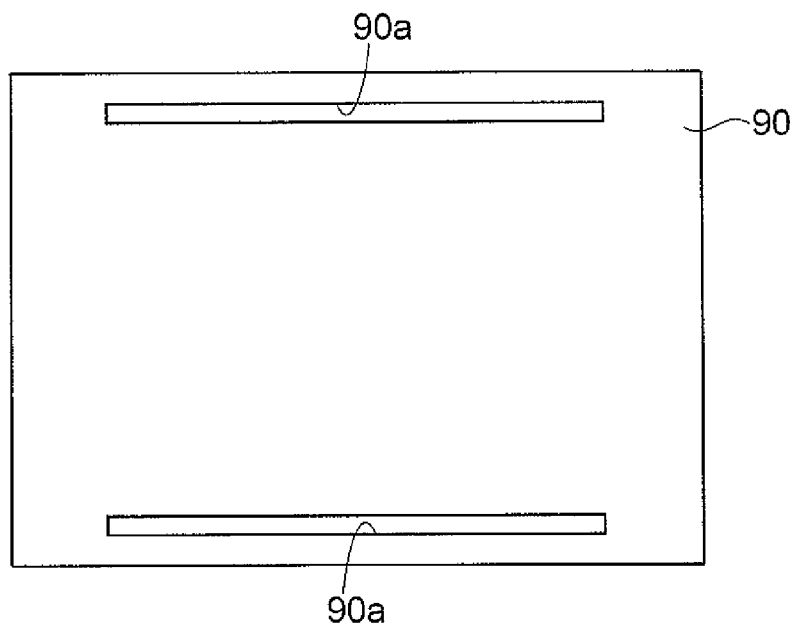
FIG. 10 is a plan view showing the structure of a diffusion plate of a backlight unit according to a sixth preferred embodiment of the present invention.

FIG. 10 is a plan view showing the structure of a diffusion plate of a backlight unit according to a sixth preferred embodiment of the present invention. In the sixth preferred embodiment, with reference to FIG. 10, a description will be given of an example, as distinct from that in the above-described first preferred embodiment, in which two catching portions 90a are provided in a diffusion plate 90. In other respects, the structure is similar to that in the above-described first preferred embodiment.

As shown in FIG. 10, the diffusion plate 90 of the backlight unit according to the sixth preferred embodiment of the present invention preferably has a rectangular or substantially rectangular shape as seen in a plan view, and the catching portions 90a are provided only at the two longer sides out of the four sides, forming the peripheral portion, of the rectangular or substantially rectangular shape. Note that the catching portions 90a may be formed only at the two shorter sides out of the four sides, forming the peripheral portion, of the rectangular or substantially rectangular shape.

The effects of the sixth preferred embodiment are similar to those of the above-described first preferred embodiment.

Seventh Preferred Embodiment

Figure 11:
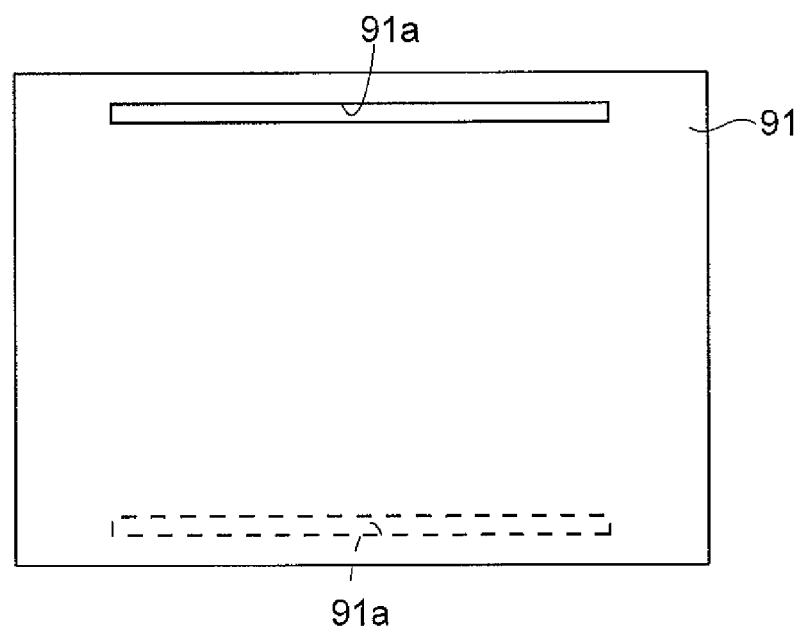
FIG. 11 is a plan view showing the structure of a diffusion plate of a backlight unit according to a seventh preferred embodiment of the present invention.
Figure 12:
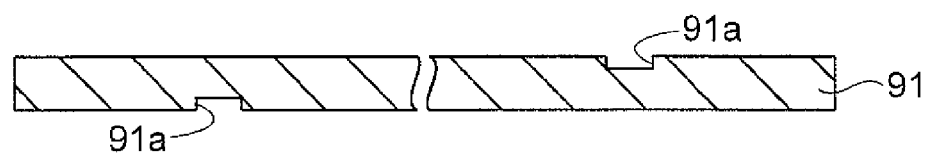
FIG. 12 is a sectional view showing the structure of the diffusion plate of the backlight unit according to the seventh preferred embodiment shown in FIG. 11.

FIG. 11 is a plan view showing the structure of a diffusion plate of a backlight unit according to a seventh preferred embodiment of the present invention. FIG. 12 is a sectional view showing the structure of the diffusion plate of the backlight unit according to the seventh preferred embodiment shown in FIG. 11. In the seventh preferred embodiment, with reference to FIGS. 11 and 12, a description will be given of an example, as distinct from that in the above-described sixth preferred embodiment, in which catching portions 91a are provided in the front surface (upper surface) and the back surface (lower surface) of a diffusion plate 91, respectively. In other respects, the structure is similar to that in the above-described sixth preferred embodiment.

As shown in FIG. 11, as in the above-described sixth preferred embodiment, the diffusion plate 91 of the backlight unit according to the seventh preferred embodiment of the present invention preferably has a rectangular or substantially rectangular shape as seen in a plan view, and the catching portions 91a are provided only at the two longer sides out of the four sides, forming the peripheral portion, of the rectangular or substantially rectangular shape. In addition, as shown in FIGS. 11 and 12, one catching portion 91a is provided in the front surface (upper surface) of the diffusion plate 91 and the other catching portion 91a is provided in the back surface (lower surface) of the diffusion plate 91. Note that the catching portions 91a may be formed only at the two shorter sides out of the four sides, forming the peripheral portion, of the rectangular or substantially rectangular shape of the diffusion plate 91.

The effects of the seventh preferred embodiment are similar to those of the above-described first preferred embodiment.

Eighth Preferred Embodiment

Figure 13:
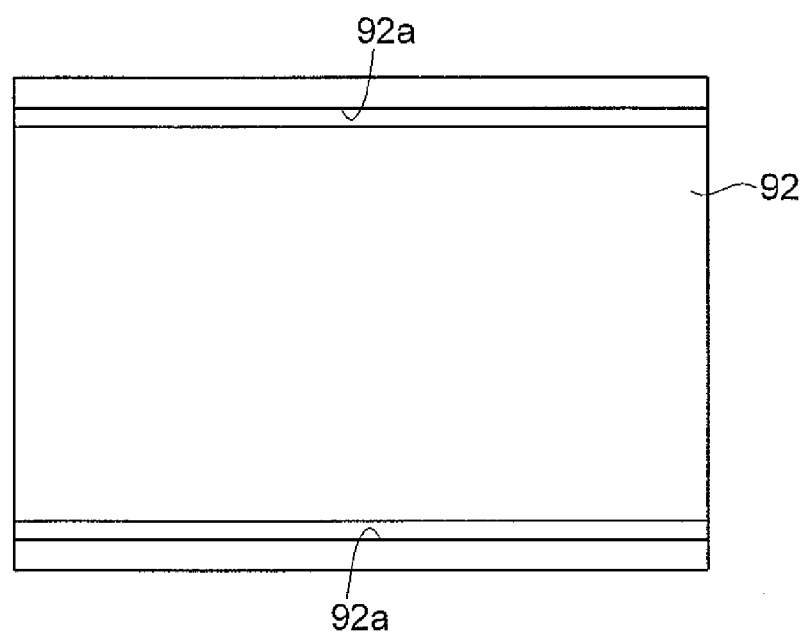
FIG. 13 is a plan view showing the structure of a diffusion plate of a backlight unit according to an eighth preferred embodiment of the present invention.

FIG. 13 is a plan view showing the structure of a diffusion plate of a backlight unit according to an eighth preferred embodiment of the present invention. In the eighth preferred embodiment, with reference to FIG. 13, a description will be given of an example, as distinct from that in the above-described sixth preferred embodiment, in which catching portions 92a are arranged so as to reach the ends of a diffusion plate 92. In other respects, the structure is similar to that in the above-described sixth preferred embodiment.

As shown in FIG. 13, as in the above-described sixth preferred embodiment the diffusion, plate 92 of the backlight unit according to the eighth preferred embodiment of the present invention preferably has a rectangular or substantially rectangular shape as seen in a plan view, and has the catching portions 92a provided only at the two longer sides out of the four sides, forming the peripheral portion, of the rectangular or substantially rectangular shape. The two catching portions 92a are arranged such that both ends thereof reach the ends (of the two shorter sides) of the diffusion plate 92. Note that the catching portions 92a may be formed only at the two shorter sides out of the four sides, forming the peripheral portion, of the rectangular or substantially rectangular shape of the diffusion plate 92. With respect to the two catching portions 92a, as in the above-described seventh preferred embodiment, it is possible to provide one catching portion 92a in the front surface (upper surface) of the diffusion plate 92, and the other catching portion 92a in the back surface (lower surface) of the diffusion plate 92.

The effects of the eighth preferred embodiment are similar to those of the above-described first preferred embodiment.

Ninth Preferred Embodiment

Figure 14:
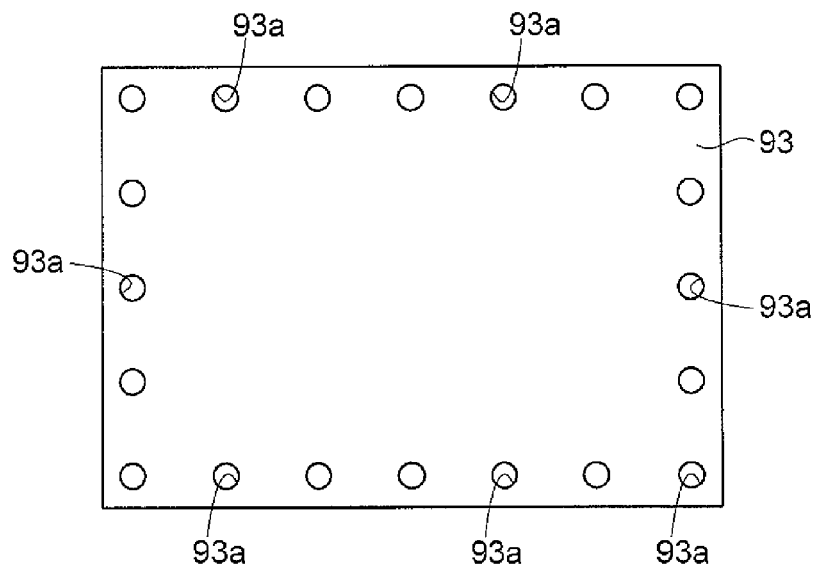
FIG. 14 is a plan view showing the structure of a diffusion plate of a backlight unit according to a ninth preferred embodiment of the present invention.

FIG. 14 is a plan view showing the structure of a diffusion plate of a backlight unit according to a ninth preferred embodiment of the present invention. In the ninth preferred embodiment, with reference to FIG. 14, a description will be given of an example, as distinct from that in the above-described first preferred embodiment, in which a catching portion 93a of a diffusion plate 93 has a circular or substantially circular shape. In other respects, the structure is similar to that in the above-described first preferred embodiment.

As shown in FIG. 14, the diffusion plate 93 of the backlight unit according to the ninth preferred embodiment of the present invention has a rectangular or substantially rectangular shape as seen in a plan view, and has a plurality of circular or substantially circular catching portions 93a provided at the four sides, forming the peripheral portion, of the rectangular or substantially rectangular shape. The plurality of catching portions 93a are arranged in a straight line along the peripheral portion of the diffusion plate 93. Note that the catching portions 93a may be formed in a shape other than a circle; for example, they may be formed in an ellipse shape or a rectangular shape (square shape). Moreover, the catching portions 93a may be formed only in corner portions of the diffusion plate 93, or be formed only in regions other than corner portions of the diffusion plate 93.

The effects of the ninth preferred embodiment are similar to those of the above-described first preferred embodiment.

Tenth Preferred Embodiment

Figure 15:
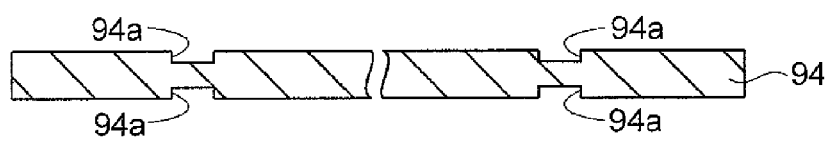
FIG. 15 is a sectional view showing the structure of a diffusion plate of a backlight unit according to a tenth preferred embodiment of the present invention.

FIG. 15 is a sectional view showing the structure of a diffusion plate of a backlight unit according to a tenth preferred embodiment of the present invention. In the tenth preferred embodiment, with reference to FIG. 15, a description will be given of an example, as distinct from that in the above-described first preferred embodiment, in which catching portions 94a are formed in the front surface (upper surface) and the back surface (lower surface) of a diffusion plate 94. In other respects, the structure is similar to that in the above-described first preferred embodiment.

As shown in FIG. 15, in the diffusion plate 94 of the backlight unit according to the tenth preferred embodiment of the present invention, the catching portions 94a preferably are provided not only in the front surface (upper surface) of the diffusion plate 94, but also in the back surface (lower surface) in regions at which catching portions 94a are provided in the front surface. Note that the catching portions 94a in the back surface of the diffusion plate 94 may be formed to have the same width as the catching portions 94a in the front surface, or be formed to have a different width from them. Moreover, the catching portions 94a in the back surface of the diffusion plate 94 may be formed to have the same depth as the catching portions 94a in the front surface, or be formed to have a different depth from them. When such a diffusion plate 94 is used, sets of two diffusion-plate presser members may be arranged such that their catching members face each other, one set at each of the four sides, or the diffusion-plate presser member may be provided with two catching members that face each other.

In the tenth preferred embodiment, as described above, the catching portions 94a preferably are provided not only in the front surface of the diffusion plate 94, but also in the back surface in regions at which the catching portions 94a are provided on the front surface. This makes it possible, by the diffusion-plate presser member, to fix the diffusion plate 94 with its being sandwiched in the top and bottom direction (the thickness direction). Thus, it is possible to prevent the diffusion-plate presser member from coming off from the catching portions 94a of the diffusion plate 94.

In other respects, the effects of the tenth preferred embodiment are similar to those of the above-described first preferred embodiment.

Eleventh Preferred Embodiment

Figure 16:
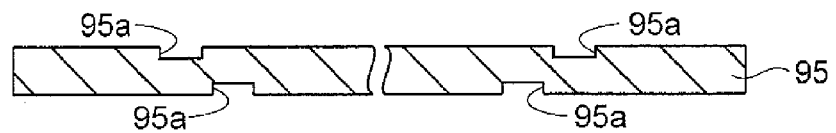
FIG. 16 is a sectional view showing the structure of a diffusion plate of a backlight unit according to an eleventh preferred embodiment of the present invention.

FIG. 16 is a sectional view showing the structure of a diffusion plate of a backlight unit according to an eleventh preferred embodiment of the present invention. In the eleventh preferred embodiment, with reference to FIG. 16, a description will be given of an example, as distinct from that in the above-described tenth preferred embodiment, in which catching portions 95a in the back surface (lower surface) of a diffusion plate 95 are arranged farther inward than catching portions 95a in the front surface (upper surface). In other respects, the structure is similar to that in the above-described tenth preferred embodiment.

As shown in FIG. 16, in the diffusion plate 95 of the backlight unit according to the eleventh preferred embodiment of the present invention, the catching portions 95a in the back surface of the diffusion plate 95 are arranged farther inward than the catching portions 95a in the front surface. In this way, when the diffusion plate 95 is likely to warp in an upward convex (or a downward convex) manner due to a rise in temperature when the light sources 21 are lit, it is possible to prevent the diffusion plate 95 from warping in an upward convex (or a downward convex) manner.

In other respects, the effects of the eleventh preferred embodiment are similar to those of the above-described tenth preferred embodiment.

Twelfth Preferred Embodiment

Figure 17:
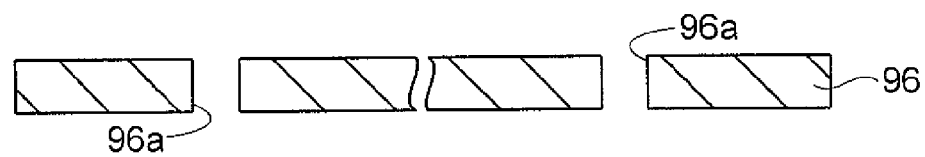
FIG. 17 is a sectional view showing the structure of a diffusion plate of a backlight unit according to a twelfth preferred embodiment of the present invention.
Figure 18:
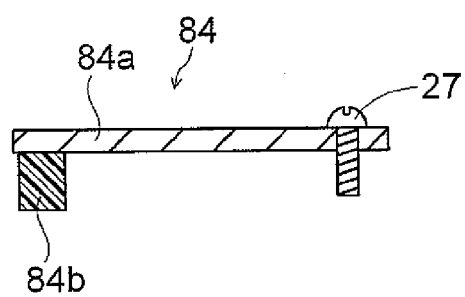
FIG. 18 is a sectional view showing the structure of a diffusion-plate presser member of the backlight unit according to the twelfth preferred embodiment of the present invention.
Figure 19:
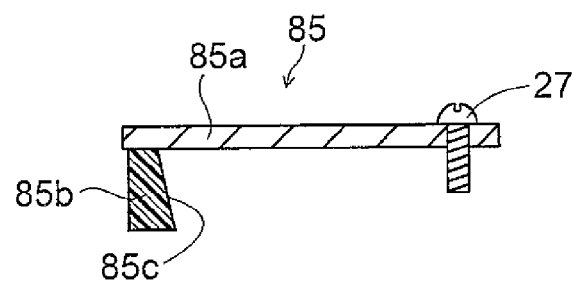
FIG. 19 is a sectional view showing the structure of the diffusion-plate presser member of the backlight unit according to the twelfth preferred embodiment of the present invention.
Figure 20A:
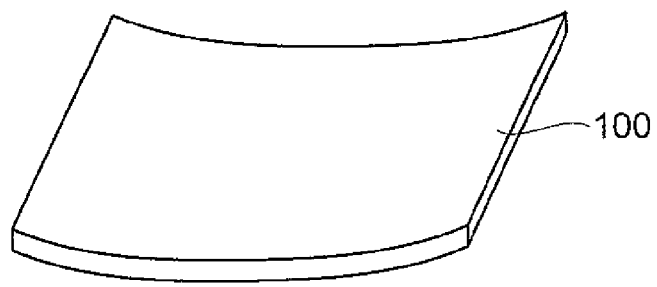
FIGS. 20A and 20B are perspective views showing a diffusion plate in a state where it is warped in a barrel shape.
Figure 20B:
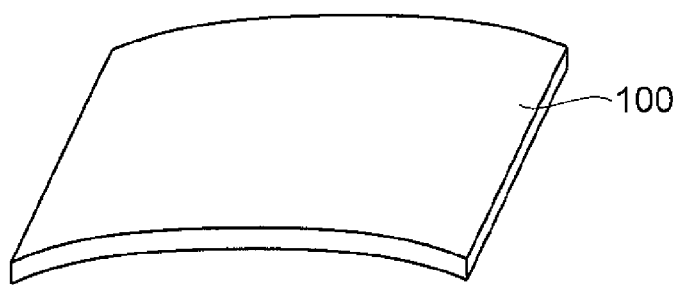
Figure 21A:
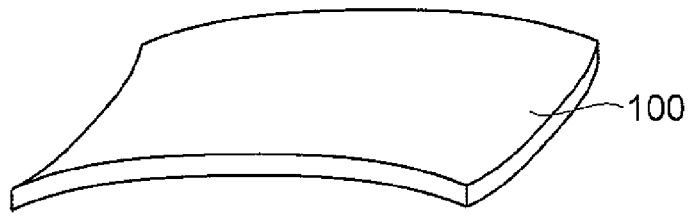
FIGS. 21A and 21B are perspective views showing a diffusion plate in a state where it is warped in a saddle shape.
Figure 21B:
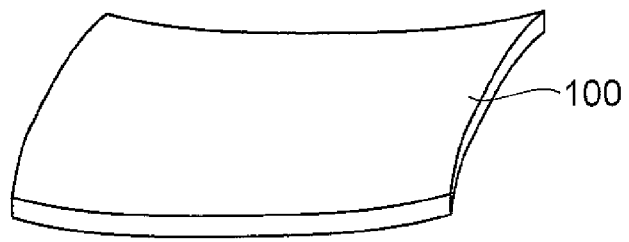

FIG. 17 is a sectional view showing the structure of a diffusion plate of a backlight unit according to a twelfth preferred embodiment of the present invention. FIGS. 18 and 19 are sectional views showing the structure of a diffusion-plate presser member of the backlight unit according to the twelfth preferred embodiment of the present invention. In the twelfth preferred embodiment, with reference to FIGS. 17 to 19, a description will be given of an example, as distinct from those in the above-described first, and sixth to ninth preferred embodiments, in which catching portions 96a in a diffusion plate 96 are defined by through holes. In other respects, the structure is similar to those in the above described first, and sixth to ninth preferred embodiments.

As shown in FIG. 17, in the diffusion plate 96 of the backlight unit according to the twelfth preferred embodiment of the present invention, the catching portions 96a are preferably formed to be through holes that penetrate the diffusion plate 96 in the vertical direction (thickness direction).

When the catching portions 96a that penetrate the diffusion plate 96 are provided as described above, it is possible to use a diffusion plate presser member 84 shown in FIG. 18. Specifically, it is possible to form the diffusion-plate presser member 84 with a plate member 84a and a catching member 84b having an equivalent length to the thickness of the diffusion plate 96. In this way, it is possible to prevent the diffusion-plate presser member 84 from coming off of the catching portions 96a of the diffusion plate 96.

Moreover, when the catching portions 96a that penetrate through the diffusion plate 96 are provided, a diffusion-plate presser member 85 shown in FIG. 19 may be used. Specifically, the diffusion-plate presser member 85 is formed with a plate member 85a and a catching member 85b having a length larger than the thickness of the diffusion plate 96, and a side surface 85c of the catching member 85b that makes contact with the diffusion plate 96 is defined by a slanted surface. Using this diffusion-plate presser member 85 makes it possible to further prevent the diffusion-plate presser member 85 from coming off of the catching portions 96a of the diffusion plate 96. Note that forming a side surface of the catching portion 96a of the diffusion plate 96 that makes contact with the catching member 85b to be a slanted surface makes it possible to further prevent the diffusion-plate presser member 85 from coming off from the catching portions 96a.

In other respects, the effects of the twelfth preferred embodiment are similar to those of the above-described first preferred embodiment.

The preferred embodiments disclosed herein are to be considered in all respects as illustrative and not restrictive. The scope of the present invention is set out in the appended claims and not in the description of the preferred embodiments hereinabove, and includes any variations and modifications within the sense and scope equivalent to those of the claims.

For example, although the above-described preferred embodiments deal with an example in which a liquid crystal display panel, a liquid crystal display unit, and a liquid crystal television receiver are applied, respectively, for a display panel, a display unit, and a television receiver, this is not meant to limit the present invention. It is also possible, instead, that display panels, display units, and television receivers other than a liquid crystal display panel, a liquid crystal display unit, and a liquid crystal television receiver may be applied, respectively.

Moreover, although the above-described preferred embodiments deal with an example in which a diffusion-plate presser member is fixed to a support pedestal, this is not meant to limit the present invention. It is also possible to fix the diffusion-plate presser member to elsewhere other than the support pedestal, for example, to a frame, etc.

Moreover, although the above-described preferred embodiments deal with an example in which light sources are preferably defined by fluorescent tubes, this is not meant to limit the present invention. It is also possible to form the light sources with discharge tubes, LEDs, or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight unit comprising:
   a light source;
   a diffusion plate arranged to diffuse light emitted from the light source;
   a support pedestal arranged to support the diffusion plate;
   an optical sheet arranged on the diffusion plate; and
   a diffusion-plate presser member; wherein
   the diffusion plate includes a catching portion defined by a concave portion or a through hole, the catching portion is provided on a peripheral portion of the diffusion plate; and
   the diffusion-plate presser member is arranged to engage with the catching portion while the diffusion plate is sandwiched between the diffusion-plate presser member and the support pedestal.

2. The backlight unit according to claim 1, wherein the catching portion of the diffusion plate is arranged so as to extend along the peripheral portion of the diffusion plate.

3. The backlight unit according to claim 1, wherein the diffusion-plate presser member is engaged with the catching portion of the diffusion plate with tension applied in a planar direction of the diffusion plate.

4. The backlight unit according to claim 3, wherein a portion of the diffusion-plate presser member that engages with the catching portion of the diffusion plate is elastically deformable.

5. The backlight unit according to claim 1, wherein the diffusion-plate presser member is arranged to sandwich the diffusion plate between the support pedestal by pressing the diffusion plate, and the diffusion-plate presser member includes a biasing member arranged to apply a biasing force in a direction in which the diffusion plate is pressed.

6. The backlight unit according to claim 1, wherein a portion of the diffusion-plate presser member that makes contact with the diffusion plate is made of resin.

7. The backlight unit according to claim 1, wherein the diffusion-plate presser member is made of metal or a metal compound.

8. The backlight unit according to claim 1, wherein a color of a surface of the diffusion-plate presser member is white/whitish or black/blackish.

9. A display unit comprising the backlight unit according to claim 1 and a display panel illuminated by the backlight unit.

10. The display unit according to claim 9, wherein the display panel is a liquid crystal display panel in which liquid crystal is sealed in between a pair of substrates.

11. A television receiver comprising:
    the display unit according to claim 9;
    a cabinet housing the display unit;
    a tuner; and
    a speaker.

* * * * *